United States Patent
Fung et al.

(10) Patent No.: US 9,424,619 B2
(45) Date of Patent: Aug. 23, 2016

(54) METHODS AND SYSTEMS FOR DETECTING FRAME TEARS

(71) Applicant: Google Inc., Mountain View, CA (US)

(72) Inventors: James Fung, Mountain View, CA (US); Joel Hesch, Mountain View, CA (US); Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 14/185,027

(22) Filed: Feb. 20, 2014

(65) Prior Publication Data
US 2015/0235335 A1    Aug. 20, 2015

(51) Int. Cl.
*G06T 1/00*   (2006.01)
*H04N 5/232*  (2006.01)
*G03B 19/00*  (2006.01)

(52) U.S. Cl.
CPC .............. *G06T 1/0021* (2013.01); *G03B 19/00* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 8,111,304 B2* | 2/2012 | Ohtsuka | ............ | G06F 17/30247 348/135 |
| 2007/0016790 A1* | 1/2007 | Brundage | .............. | B42D 15/10 713/176 |
| 2009/0231455 A1* | 9/2009 | Emery | ............... | H04N 1/32203 348/222.1 |
| 2010/0162338 A1* | 6/2010 | Makhija | ................. | H04N 7/173 725/114 |
| 2010/0325154 A1* | 12/2010 | Schloter | ............ | G06F 17/30265 707/770 |
| 2014/0192245 A1* | 7/2014 | Lee | .................... | H04N 5/23293 348/333.05 |
| 2015/0035977 A1* | 2/2015 | Schrepfer | .............. | H04N 7/183 348/143 |

* cited by examiner

*Primary Examiner* — Albert Cutler

(57) ABSTRACT

Methods and systems for detecting frame tears are described. As one example, a mobile device may include at least one camera, a sensor, a co-processor, and an application processor. The co-processor is configured to generate a digital image including image data from the at least one camera and sensor data from the sensor. The co-processor is further configured to embed a frame identifier corresponding to the digital image at least two corner pixels of the digital image. The application processor is configured to receive the digital image from the co-processor, determine a first value embedded in a first corner pixel of the digital image, and determined a second value embedded in a second corner pixel of the digital image. The application processor is also configured to provide an output indicative of a validity of the digital image based on a comparison between the first value and the second value.

20 Claims, 10 Drawing Sheets

| LINE | PIXEL 0 (Y) | PIXEL 1 (Y) | PIXEL 2 (Y) | PIXEL 3 (Y) | PIXEL 4 (Y) | ... | PIXEL N (Y) |
|---|---|---|---|---|---|---|---|
| 0 | GLOBAL_ID | SEGMENT_ID | ACCEL_X_H | ACCEL_X_L | ACCEL_Y_H | ... | GLOBAL_ID |
| 1 | GYRO_X_H | GYRO_X_L | GYRO_Y_H | GYRO_Y_L | GYRO_Z_H | ... | ... |
| 2 | MAG_X_H | MAG_X_L | MAG_Y_H | MAG_Y_L | MAG_Z_H | ... | ... |
| 3 | BARO_B3 | BARO_B2 | BARO_B1 | BARO_B0 | | ... | ... |
| 4 | TEMP_I_H | TEMP_I_L | TEMP_F_H | TEMP_F_L | | ... | ... |
| 5 | TIMESTAMP_B3 | TIMESTAMP_B2 | TIMESTAMP_B1 | TIMESTAMP_B0 | | ... | ... |
| ... | ... | ... | ... | ... | ... | ... | ... |
| 15 | SEGMENT_ID | FEATURE1_B3 | FEATURE1_B2 | FEATURE1_B1 | FEATURE1_B0 | ... | SEGMENT_ID |
| 16 | SEGMENT_ID | ... | ... | ... | ... | ... | SEGMENT_ID |
| ... | ... | ... | ... | ... | ... | ... | ... |

Columns PIXEL 0 through the second-to-last correspond to SENSOR DATA; the last column corresponds to COMPUTER-VISION DATA.

| LINE / ROW | |
|---|---|
| 0 - 15 | SENSOR DATA |
| 16 - 30 | COMPUTER-VISION DATA |
| 31 - 510 | FIRST (WIDE-ANGLE) CAMERA DATA<br>640 x 480 |
| 511-690 | DEPTH DATA<br>320 x 180 |
| 691 - 1170 | SECOND CAMERA DATA<br>640 x 480 |

METHODS AND SYSTEMS FOR DETECTING FRAME TEARS

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging and positioning. A few examples of sensors that may be found in a mobile device include accelerometers, gyroscopes, magnetometers, barometers, global positioning system (GPS) receivers, microphones, cameras, Wi-Fi sensors, Bluetooth sensors, temperature sensors, and pressure sensors, among other types of sensors.

The wide variety of available sensors enables mobile devices to perform various functions and provide various user experiences. As one example, a mobile device may use imaging and/or positioning data to determine a trajectory of the mobile device as a user moves the mobile device through an environment. As another example, a mobile device may use imaging and/or positioning data to generate a 2D or 3D map of an environment, or determine a location of a mobile device within a 2D or 3D map of an environment. As a further example, a mobile device may use imaging and/or positioning data to facilitate augmented reality applications. Other examples also exist.

SUMMARY

Within examples, a co-processor of the mobile device may be configured to provide data from two or more sensors to an application processor within a single data structure. For instance, the co-processor may be configured to generate a digital image that includes image data acquired using a camera of the mobile device as well as sensor data from another sensor of the mobile device. To include the sensor data within the digital image, the co-processor may be configured to embed the sensor data within one or more pixels of the digital image. The digital image can then be transmitted to the application processor over a camera bus interface in order to quickly transmit a large amount of data. Moreover, multiple digital images can be provided in sequence, as new image data and sensor data is acquired by the mobile device.

Disclosed herein are methods and systems that enable testing for errors resulting from the generation, transmission, or reception of such a digital image. As described below, example methods may involve embedding one or more frame identifiers within the digital image at predetermined pixel positions. The embedded frame identifiers may enable the application processor to test for errors in the digital image. For example, the described methods and systems may allow the application processor to identify whether a particular digital image includes data that was intended to be included within a prior or subsequent digital image but was improperly included within the digital image.

In one example aspect, a method is provided. The method includes receiving, by a processor of a mobile device, image data from at least one camera of the mobile device and sensor data from at least one sensor of a plurality of sensors of the mobile device. The method also includes generating, by the processor, a digital image that includes at least the image data and the sensor data. The sensor data may be embedded in pixels of the digital image. The method further includes embedding, by the processor, a frame identifier corresponding to the digital image in at least two corner pixels of respective corners of the digital image. Additionally, the method includes providing, by the processor, the digital image to an application processor of the mobile device.

In another example aspect, a mobile device that includes at least one camera, a sensor, a co-processor, and an application processor is provided. The co-processor is configured to generate a digital image that includes image data from the at least one camera and sensor data from the sensor. The sensor data is embedded in pixels of the digital image. The co-processor is further configured to embed a frame identifier corresponding to the digital image in at least two corner pixels of respective corners of the digital image. The application processor is configured to receive the digital image from the co-processor, determine a first value embedded in a first corner pixel of the at least two corner pixels, and determine a second value embedded in a second corner pixel of the at least two corner pixels. The application processor is also configured to provide an output indicative of a validity of the digital image based on a comparison between the first value and the second value.

In still another example aspect, a method is provided. The method includes receiving, by an application processor of a mobile device and from a co-processor of the mobile device, a digital image that includes image data from at least one camera of the mobile device and sensor data from at least one sensor of the mobile device. The sensor data is embedded in pixels of the digital image. The digital image also includes a frame identifier embedded in at least two corner pixels of respective corners of the digital image. The method also includes determining, by the application processor, a first value embedded in a first corner pixel of the at least two corner pixels and a second value embedded in a second corner pixel of the at least two corner pixels. The method further includes providing an output indicative of a validity of the digital image based on a comparison between the first value and the second value.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a conceptual illustration of example sensor data formats.

FIG. 7 is another conceptual illustration of an example digital image format.

DETAILED DESCRIPTION

Figure 1:
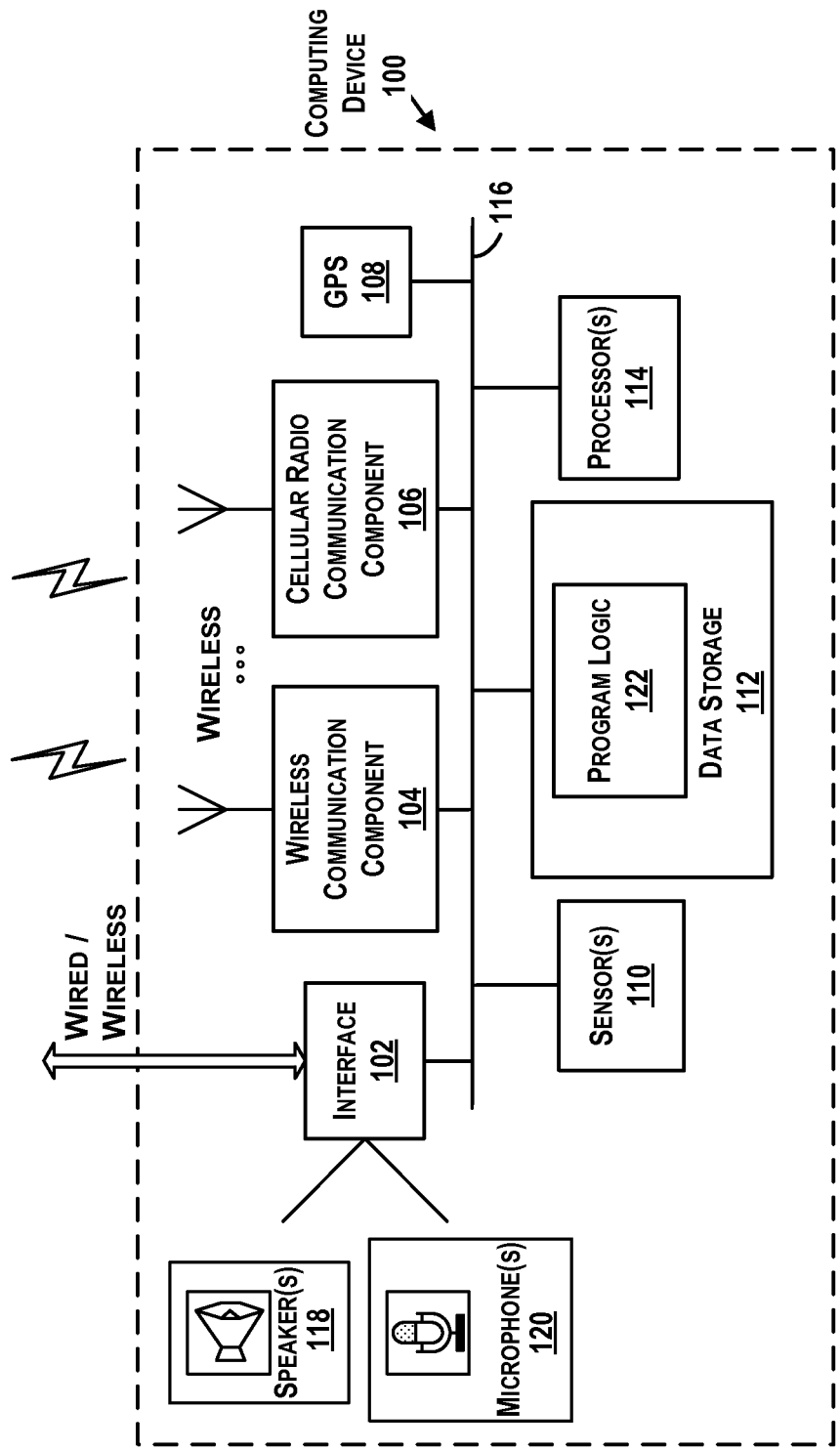
FIG. 1 illustrates an example computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In examples in which a mobile device relies on data from two or more sensors to perform a particular function (e.g., trajectory determination, map generation, etc.), it can be beneficial to provide data from each of the sensors to an application processor within a single data structure. Providing data from each of the sensors within a single data structure may help ensure that data from each of the sensors corresponds to data collected during the same instance in time or a same time period.

If the data from one or more of the sensors is an image, one solution is to generate a digital image that includes both the image and the sensor data from another sensor. For instance, a co-processor of the mobile device may be configured to embed the sensor data within one or more pixels of the digital image. The digital image can then be provided to the application processor using a camera bus interface. Furthermore, if image data and sensor data are repeatedly being acquired (e.g., at a frequency of 60 Hz, or at other rates), multiple digital images that include new image data and sensor data can be generated and provided in sequence to the application processor.

When multiple digital images are being generated by the co-processor and provided to the application processor at a high frame rate, there is a possibility of frame tearing occurring. A frame tear may occur when data intended to be included within a first digital frame is mistakenly included within a second digital frame (e.g., a prior or subsequent digital frame). Similarly, frame tearing may unintentionally occur if one or more data packets are dropped during the generation or transmission of a digital image.

Disclosed herein are methods and systems that enable testing for frame tears, or other possible errors, resulting from the generation, transmission, or reception of a digital image that includes data from two or more sensors of the mobile device. In one example, a co-processor of the mobile device may be configured to generate a digital image that includes image data from at least one camera of the mobile device and sensor data from at least one sensor of the mobile device. For instance, the sensor data may be accelerometer data that is embedded within pixels of the digital image. Furthermore, the co-processor may be configured to embed a frame identifier corresponding to the digital image in at least two corner pixels of respective corners of the digital image.

As an example, the frame identifier may be a frame number corresponding to the digital image. In some instances, the frame identifier may be embedded in a top-left corner pixel and a bottom-right corner pixel of the digital image. In other instances, the frame identifier may be embedded in a corner pixel of each of the corners of the digital image. As described herein, a corner pixel need not be the precise corner pixel of the digital image. Rather, a corner pixel may refer to a pixel that is within a threshold number of columns and a threshold number of rows from a corner of the digital image. For instance, a corner pixel may be defined as any pixel that is located within five rows and within five columns of a corner of the digital image, such that a pixel located in pixel position of row 3, column 3 of a digital image may be considered a corner pixel.

Additionally, in some examples, the digital image may be divided into one or more segments or regions, and the co-processor may be configured to embed frame identifiers within respective regions of the digital image. For instance, the digital image may include a first segment of pixels corresponding to image data from a camera of the mobile device and second segment of pixels corresponding to sensor data from one or more sensors of the mobile device. The co-processor may then be configured to embed a frame identifier within one or more corner pixels of the first segment of pixels and one or more corner pixels of the second segment of pixels.

In some instances, the frame identifier embedded in the corner pixels of the first segment and second segment ("segment frame identifier") may be the same as the frame identifier identified in the corner pixels of the digital image ("global frame identifier"). In other instances, the segment frame identifier may be different from the global frame identifier. Furthermore, the segment frame identifier embedded within the first segment of pixels may be the same or different from the segment frame identifier embedded within the second segment of pixels.

Additionally, within examples, an application processor that receives a generated digital image from the co-processor may be configured to test the received digital image for errors using the embedded global frame identifiers and/or segment frame identifiers. The application processor may be configured to identify frame identifiers embedded within predetermined pixel positions, and compare the frame identifiers to one another. For instance, the application processor may be configured to determine a first value embedded in a first corner pixel of the digital image, and determine a second value embedded in a second corner pixel of the digital image. Based on a comparison between the first value and the second value, the application processor may provide an output indicative of a validity of the digital frame. For example, the application processor may provide an output indicating that the digital frame is valid in response to determining that the first value is equal to the second value.

Similarly, in some examples, the application processor may be configured to identify the value of two or more segment frame identifiers embedded within a particular segment of pixels of the digital image. For instance, the application processor may be configured to compare a first value embedded within a first corner pixel of a segment of pixels and a second value embedded within a second corner pixel of the segment of pixels. The application processor may then provide an output indicative of a validity of the digital image. If the application processor is configured to test the digital image using global frame identifiers as well as the segment frame identifiers, the application processor may provide an output indicating that the digital frame is valid if each of the global frame identifiers are equal and each of the segment frame identifiers are equal.

Additionally or alternatively, the application processor may provide another output indicating a validity of the segment of pixels, irrespective of the validity of the digital image. For example, if each of the segment frame identifiers embedded within the segment of pixels are equal, the application processor may provide an output indicating that the segment of pixels is valid.

Additional example methods as well as example devices (e.g., mobile or otherwise) are described hereinafter with reference to the accompanying figures.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global positioning system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
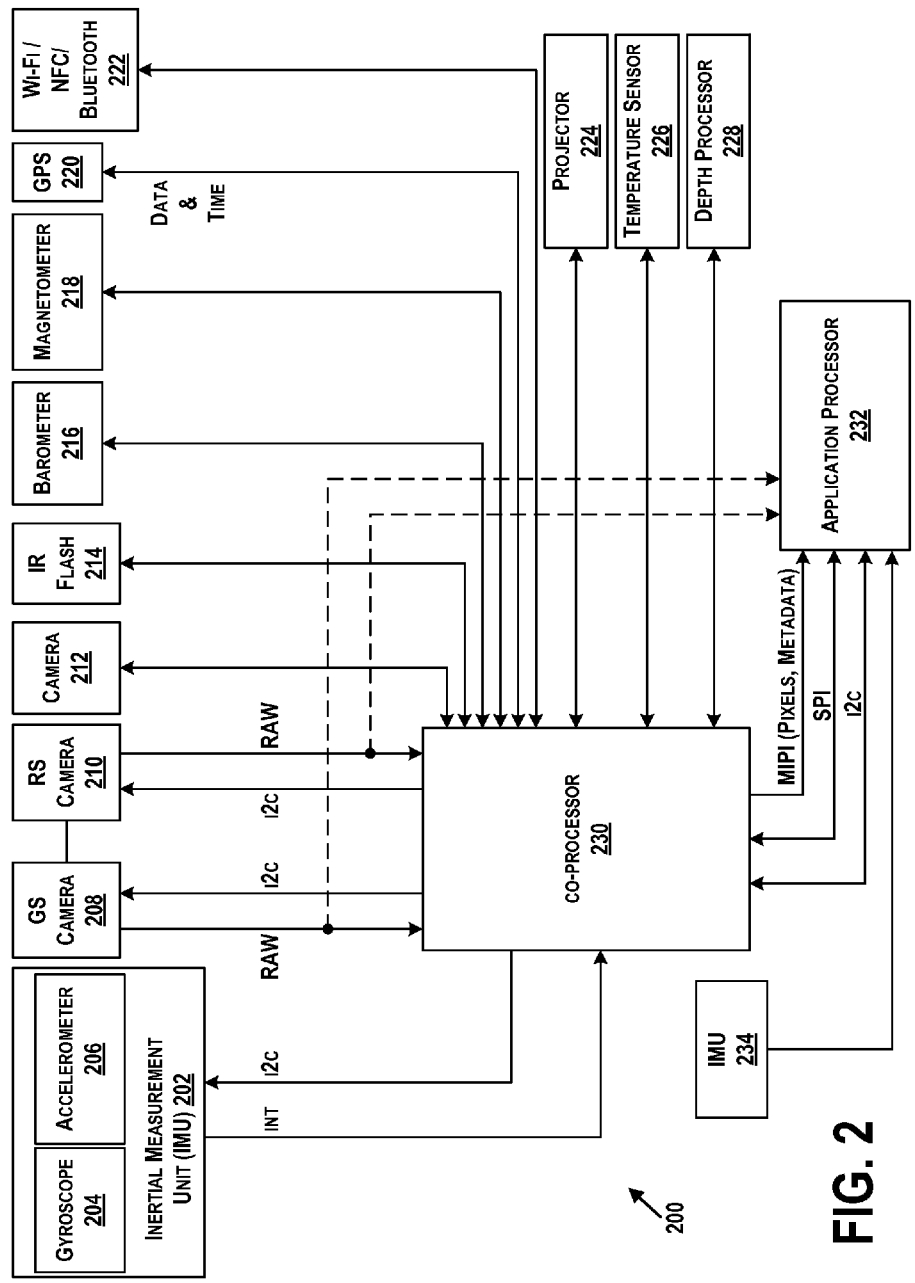
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a Wi-Fi/NFC/Bluetooth sensor 222, a projector 224, and a temperature sensor 226, each of which outputs to a co-processor 230. Additionally, the computing device 200 is shown to include a depth processor 228 that receives input from and outputs to the co-processor 230. And the co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
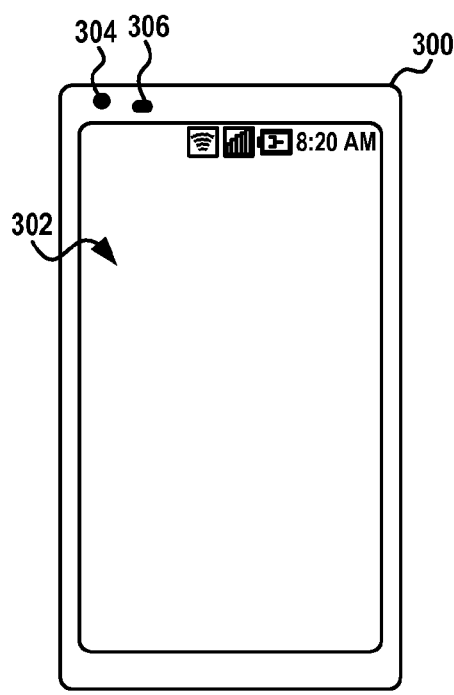
FIGS. 3A-3B are conceptual illustrations of an example computing device.
Figure 3B:
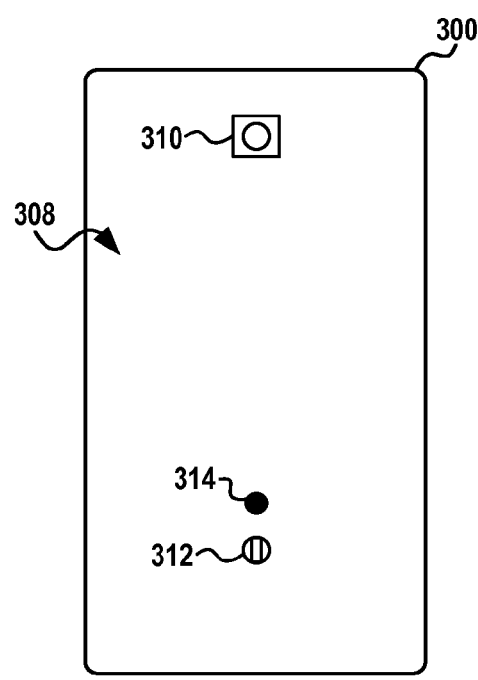

FIGS. 3A-3B are conceptual illustrations of a computing device 300 that show a configuration of some of the sensors on the computing device 300. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The Wi-Fi/NFC/Bluetooth sensor 222 may include wireless communication components configured to operate according to Wi-Fi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the RS camera 210 may be an RGB-IR camera that is configured to capture one or more images of the dot pattern and provide image data to the depth processor 228. The depth processor 228 may then be configured to determine distances to and shapes of objects based on the projected dot pattern. By way of example, the depth processor 228 may be configured to cause the projector 224 to produce a dot pattern and cause the RS camera 210 to capture an image of the dot pattern. The depth processor may then process the image of the dot pattern, use various algorithms to triangulate and extract 3D data, and output a depth image to the co-processor 230.

The temperature sensor 226 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232. The co-processor 230 may also be configured to perform other functions, as described below.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210. The application processor 232 may also be configured to perform other functions, as described below.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
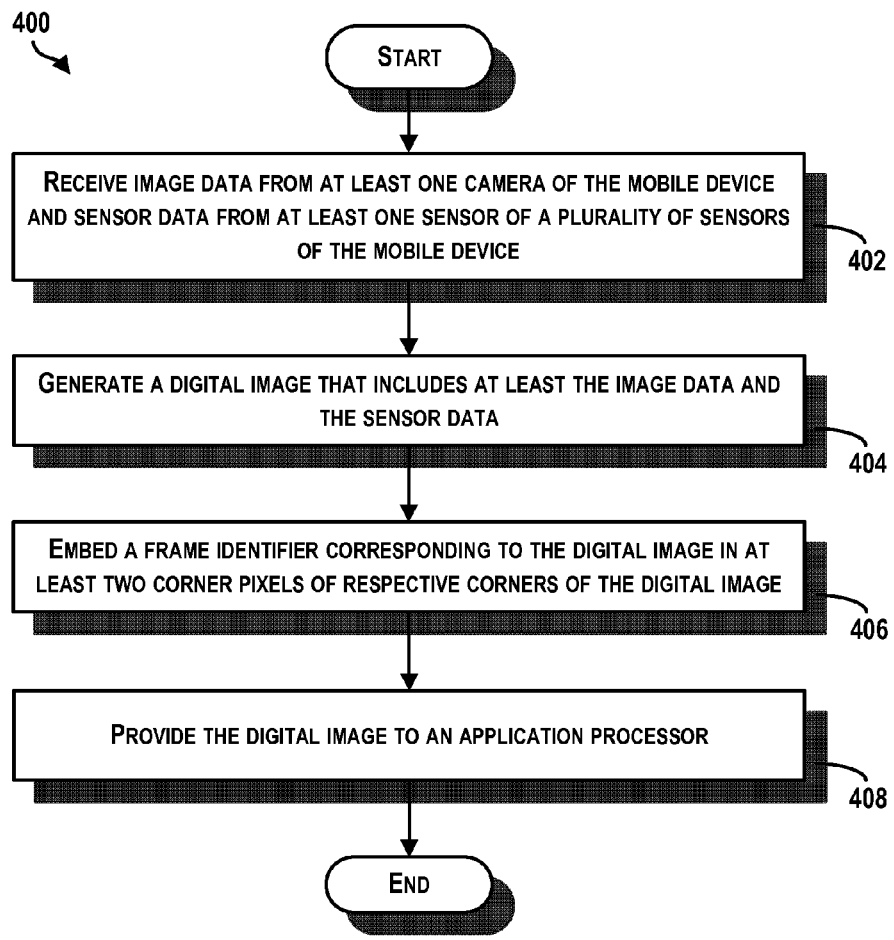
FIG. 4 is a block diagram of an example method for generating a digital image.

FIG. 4 is a block diagram of an example method 400 for generating a digital image. Method 400 shown in FIG. 4 presents an embodiment of a method that could be used or implemented by the computing device 100 of FIG. 1 or the computing device 200 of FIG. 2, for example, or more generally by one or more components of any computing device. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

In one embodiment, functions of the method 400 may performed by a co-processor of a mobile device, such as the co-processor 230 of FIG. 2. In other embodiments, the functions of the method 400 may be distributed across multiple processors that are configured to acquire sensor data, generate a digital image, and/or generate a portion of the digital image, such as a particular segment of pixels of the digital image.

Initially, at block 402, the method 400 includes receiving image data from at least one camera of the mobile device and sensor data from at least one sensor of a plurality of sensors of the mobile device. The image data may include one or more images received from one or more of the global shutter camera 208, rolling shutter camera 210, camera 212, and/or depth processor 228. Thus, in some examples, the image data from the at least one camera may include first image data from a first camera and second image data from a second camera. Furthermore, the image data may include one or any combination of two-dimensional images and three-dimensional (e.g., depth) images.

The sensor data my include data from any of the sensors as described above in any of FIG. 1, FIG. 2, or FIGS. 3A-3B, for example, including an IMU, an accelerometer, a gyroscope, a barometer, a magnetometer, and a temperature sensor. It is contemplated that the sensors may include other types of sensors as well.

At block 404, the method 400 includes generating a digital image that includes at least the image data and the sensor data. For example, a file may be generated in a digital image format that includes both the image data and the sensor data. The image data may already be in pixel format, therefore the image data may be included in the digital image in a straightforward manner. Optionally, the image data may be converted from a first image format to a second image format in which the digital image is generated.

The sensor data may be included within the digital image by embedding the sensor data in multiple pixels of the digital image. For instance, the co-processor may be configured to represent the sensor data as fake pixels in the digital image (i.e., pixels whose values have been defined by a processor to represent a portion of a sensor value).

By way of example, the digital image may include pixels that are defined in a brightness and chrominance (YUV) color space. A 16-bit raw sensor value can then be embedded in a "Y" space of two pixels. For instance, eight bits of the 16-bit raw sensor value can be represented in a "Y" space of a first pixel and the remaining eight bits can be embedded in a "Y" space of a second pixel. Values in the "U" space and the "V"

space of the pixels can be set to zero in order to ensure that the sensor value is not skewed during image compression or packing, for example.

As another example, a 32-bit single-precision floating point number can be represented in the "Y" space of four separate 8-bit pixels, while values in the "U" space and the "Y" space can be set to zero. Other examples are also possible depending on the number of bytes per pixel and/or color space utilized by the digital image. For instance, the sensor data may be embedded in the "U" space or "V" space instead of the "Y" space.

At block 406, the method 400 includes embedding a frame identifier corresponding to the digital image in at least two corner pixels of respective corners of the digital image. As discussed above, corner pixels of the digital image may include pixels of the digital image that are within a threshold number of rows and a threshold number of columns from each corner of the digital image. The frame identifier may be a number, such as an integer that is incremented sequentially with each new digital image that is generated. For instance, for a first digital image, the frame identifier may be the integer one, for a second digital image, the frame identifier may be the integer two, and so forth.

In some examples, the frame identifier may be embedded in four corner pixels of four respective corners of the digital image. However, other configurations are also possible, such as embedding the global frame identifier in corner pixels of two or three respective corners of the digital image. Depending on the size of the frame identifier, the frame identifier may be embedded in one or more pixels. For instance, an 8-bit number may be embedded within the "Y" space of a single pixel. Similarly, a 16-bit number may be embedded within the "Y" space of two pixels.

At block 408, the method 400 includes providing the digital image to an application processor. For instance, the digital image may be provided by the co-processor and to the application processor using a camera bus interface, such as a MIPI. In some examples, the digital image may be generated at 30 Hz, such that a new digital image with new image data and/or sensor data is provided to the application processor every 33 ms.

In some examples, the method 400 may further include embedding frame identifiers within corners of one or more segments of pixels within the digital image. For example, the digital image may include a first segment of pixels corresponding to the image data and a second segment of pixels corresponding to the sensor data. Depending on the desired configuration, a frame identifier may then be embedded within at least two respective corners of the first segment of pixels, and/or a frame identifier may be embedded within at least two respective corners of the second segment of pixels. If the digital image includes more than two segments of pixels, a frame identifier may similarly be embedded within any of the additional segments of pixels.

As described herein, a corner pixel of a segment of pixels of the digital image need not be the precise corner pixel of the segment of pixels. Rather, a corner pixel of a segment of pixels may refer to a pixel that is within a threshold number of columns and a threshold number of rows (e.g., three columns and two rows) from a corner of the segment of pixels.

For purposes of explanation, the frame identifiers embedded within the corners of the digital image may be referred to as global frame identifiers and the frame identifiers embedded within corners of the segments of the digital image may be referred to as segment frame identifiers.

In some embodiments, the same frame identifier may be used as the global frame identifier and the segment frame identifier(s) for a particular digital image. For instance, the global frame identifier and the segment frame identifier(s) for a particular digital image may be an integer that identifies the particular digital image.

In other embodiments, the global frame identifier may be different from the segment frame identifier. For instance, if the digital image includes two-dimensional image data that is received at 30 Hz and three-dimensional image data that is received at 15 Hz, and the co-processor is configured to generate digital images at 30 Hz, a first digital image and a subsequent digital image may include the same three-dimensional data. Consequently, the segment frame identifier for the three-dimensional image data may be different from the global frame identifier.

Figure 5:
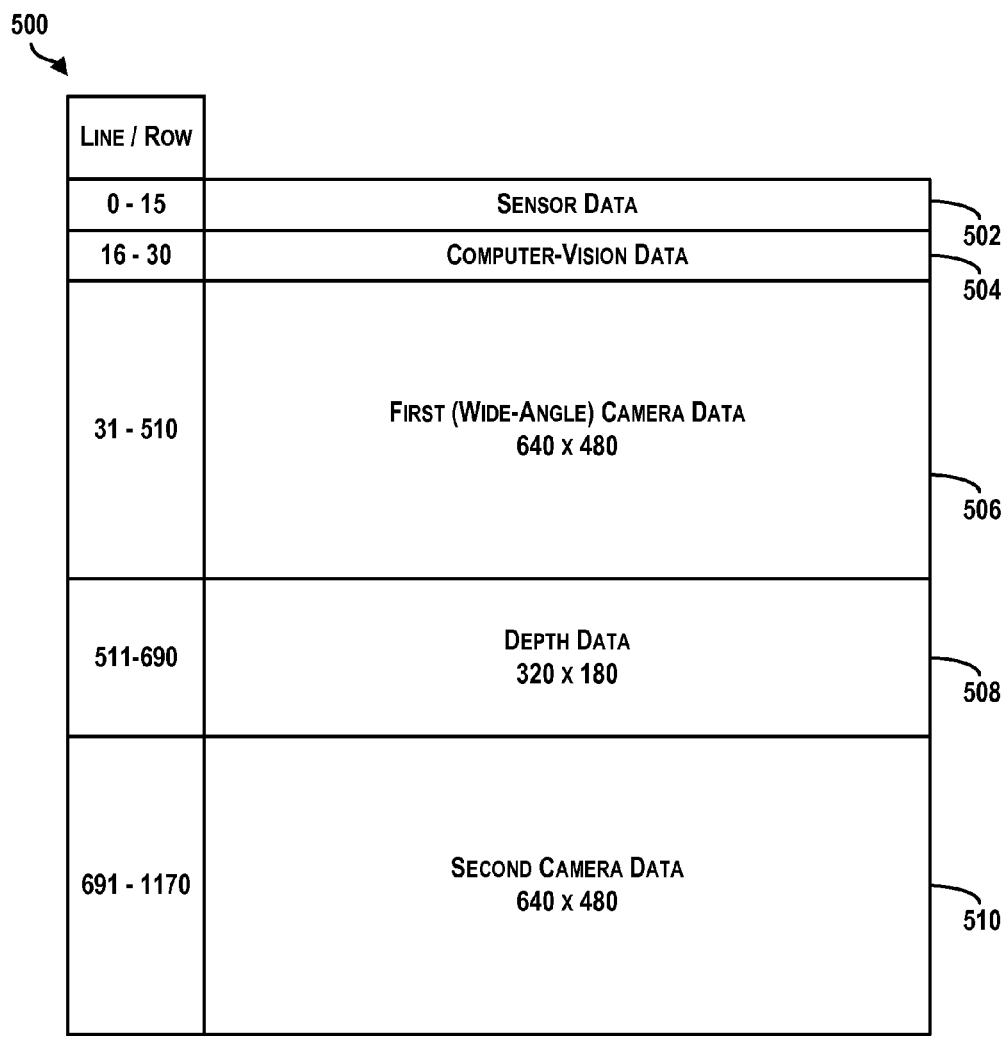
FIG. 5 is a conceptual illustration of an example digital image format.

Turning now to FIG. 5, FIG. 5 is a conceptual illustration of an example digital image format. The conceptual illustration 500 is shown for purposes of example only, and is not meant to be limiting in any manner. Other configurations and formats for the digital image are also contemplated.

As shown in FIG. 5, the example digital image format includes sensor data 502, computer-vision data 504, first camera data 506, depth data 508, and second camera data 510. The sensor data 502 is shown within the first sixteen rows of a digital image. Thereafter, in the next few rows, the computer-vision data 504 is provided. Consequently, in an example in which the digital image is provided to the application processor row by row, the sensor data 502 would first be provided, followed by the computer-vision data 504.

The computer-vision data may identify locations and/or descriptions of image features determined using a two-dimensional image and/or image features determined using depth data. Example types of image features include edges, corners/interest points, and blobs. An edge is a point in an image where there is a boundary between two image regions. Corners, or more generally interest points, refer to point-like features in an image which have a local two-dimensional structure. Algorithms such as the Harris & Stephens algorithm can be used to detect edges and corners. The Features from Accelerated Segment Test (FAST) algorithm is another example of an algorithm that may be used to detect corners and interest points. Finally, blobs describe regions of interest in an image (e.g., regions that are too smooth to be detected by a corner detector). The FAST algorithm, among others, can also be used to detect blobs.

Below the sensor data 502 and computer-vision data 504, which are shown as occupying 31 rows in the example digital image format 500, larger data sources are provided. The larger data sources include the first camera data 506, followed by the depth data 508, and the second camera data 510. In one example, the first camera data 506 may be an image from a first camera having a field of view that is greater than 120 degrees, such as the GS camera 208 of FIG. 2. Further, the second camera data may be an image from a second camera having a smaller field of view, such as the RS camera 210 of FIG. 2.

Note that the example digital image format shown in FIG. 5 is just one example. In other instances, other digital image formats may be utilized. For instance, the first camera data 506 and the second camera data 510 may be located side-by-side within rows 31-510 of a digital image (not shown). Similarly, in other example digital image formats, more or less data may be provided. For instance, in another digital image format the depth data or the computer-vision data may be omitted, or third camera data from a third camera may also be included. As another example, in another digital image format, a combined color and depth image may be provided in addition to or in place of the first camera data 506, the depth data 508, and/or second camera data 510.

In another example digital image format, the digital image may include padding between one or more of the different data segments. For example, the digital image may be padded with blank or empty data in between the first camera data 506 and the depth data 508 or between the depth data 508 and the second camera data 510. In some instances, the padding between the different data segments may be inserted in order to make sure that the beginning of each data segment corresponds to the beginning of a sector or subdivision of a track in a memory.

As an example, padding may be inserted between data segments to make sure that the beginning of the first camera data 506 corresponds to the beginning of a 4096-byte (4K) sector. This may allow the first camera data 506 to be written more efficiently to memory. Similarly, the digital image may be padded such that the beginning of each of the depth data 508 and second camera data 510 corresponds to the beginning of a 4K sector.

In another example digital image format, the width of the digital image may be 1280 pixels. As a result, each row of the digital image may include two rows of pixel data from the first camera data. The rows may be organized side-by-side. For example, columns 0-639 of row 31 of the digital image may include a first row of pixels of the first camera data 506 and columns 640-1279 of row 31 may include a second row of pixels of the first camera data 506. Similarly, a single row of the digital image may include two rows of depth data 508 or two rows of pixels of second camera data 510.

In FIG. 6, a conceptual illustration 600 of example sensor data formats is provided. As shown in FIG. 6, a global frame identifier may be provided in the "Y" space of first pixel of a first line (e.g., a first row of pixels) of a digital image. Additionally, the global frame identifier may be provided within the "Y" space of the last pixel of line zero. Furthermore, a segment frame identifier may be embedded within the "Y" space of a second pixel of line 0.

Accelerometer data is provided in line zero as well. In particular, the eight highest bits of a 16-bit x-axis acceleration value (i.e., a high byte) are shown within the "Y" space of a third pixel while the eight lowest bits of the 16-bit x-axis acceleration value (i.e., a low byte) are shown within the "Y" space of a fourth pixel. Similarly, y-axis acceleration values may be embedded within the "Y" space of pixels 4-5 and 6-7 respectively. Furthermore, gyroscope data and magnetometer data are also embedded within the "Y" space of pixels 0-5 of lines 1 and 2.

The barometer reading is shown as four separate bytes (B3, B2, B1, and B0) that, when combined, represent a 32-bit number. In line 4, an integer component of a temperature reading is shown in the "Y" space of pixels 0-1, while a fraction component of the temperature reading is shown in the "Y" space of pixels 2-3. Additionally, a timestamp that has been divided into four eight bit values is also shown in line 5. In other examples, the sensor data may also include timestamp data for one or more of the other sensors.

Although sensor data for each type of sensor is located within an individual row of pixels in FIG. 6, in other examples, the sensor data may be represented within a single row of pixels (not shown). For example, the gyroscope data may be embedded in the "Y" space of pixels 8-13, the magnetometer data may be represented in the "Y" space of pixels 14-19, and so forth.

In line 15, the last line of the segment of pixels corresponding to the sensor data, segment frame identifiers are provided within the "Y" space of the first pixel and the last pixel.

In line 16, an example computer-vision data section begins. As shown in FIG. 6, a segment frame identifier is provided within the "Y" space of the first pixel and the last pixel of the first line (line 16) of the segment. Additionally, a first four-byte image feature is embedded in the "Y" space of pixels 1-4 of line 16. Thereafter, a second, two-byte, image feature may be embedded in the "Y" space of pixels 5-6 (not shown). The segment frame identifier may also be provided within the "Y" space of the first pixel and the last pixel of a last line of the segment (not shown). Other configurations are also contemplated. For instance, in another configuration, the computer-vision data and the sensor data may be provided within a single segment of pixels.

Figure 8:
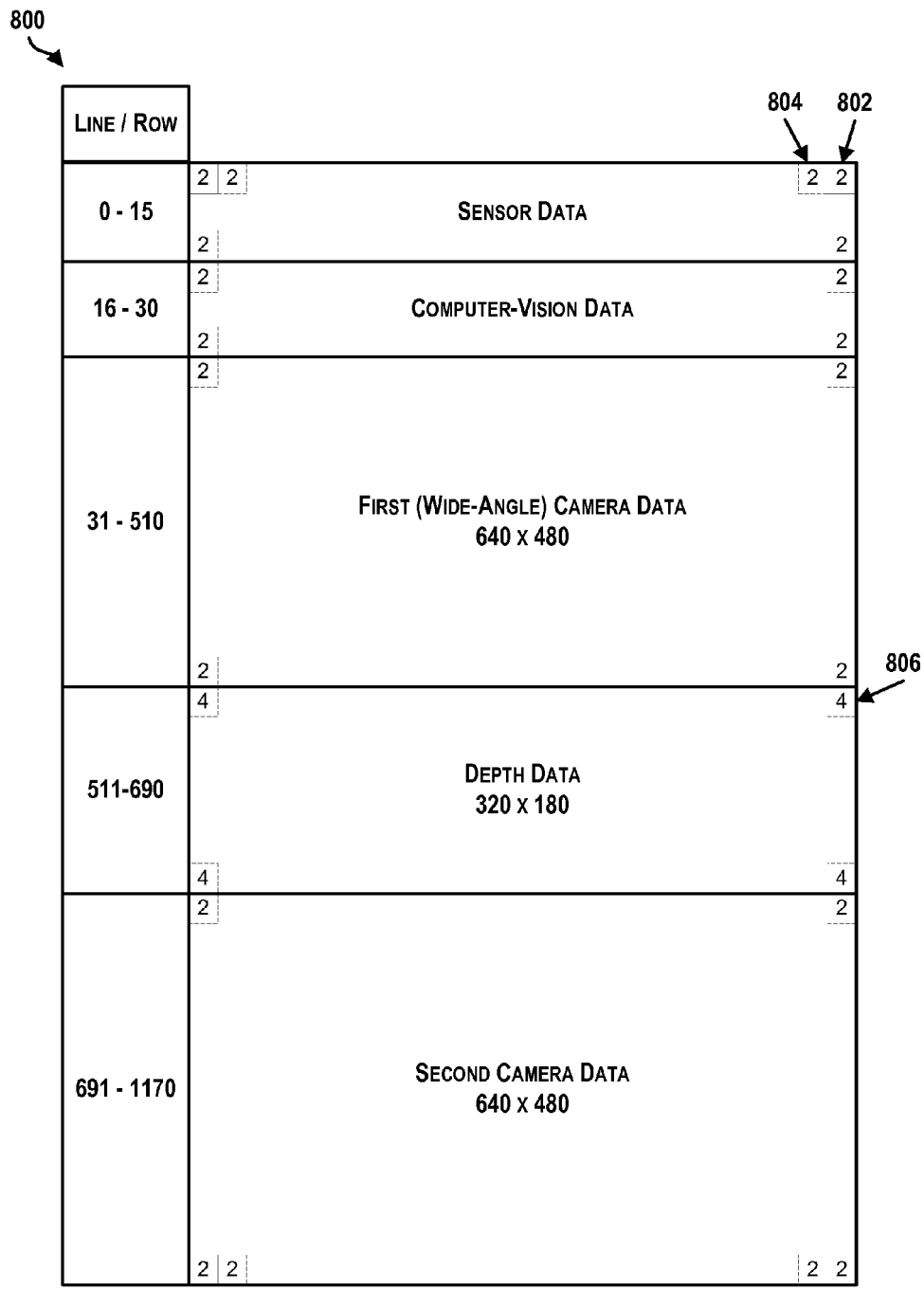
FIG. 8 is another conceptual illustration of an example digital image format.

Referring now to FIGS. 7 and 8, conceptual illustrations of example digital image formats that include frame identifier(s) are described. As shown in the conceptual illustration 700 of FIG. 7, in one example configuration, a global frame identifier 702 may be embedded within corner pixels of four corners of the digital image. For example, the frame number "2" may be embedded within a corner pixel in each corner of the digital image.

FIG. 8 illustrates a conceptual illustration 800 of an example digital image format that includes both a global frame identifier 802 and different segment frame identifiers 804, 806. The global frame identifier 802 is illustrated using a square with a solid-line perimeter, while the segment frame identifiers 804, 806 are illustrated using a dotted-line perimeter.

As shown in FIG. 8, the global frame identifier 802 is provided within each of four corners of the digital image. A first segment identifier 804 is provided within four corners of the sensor data segment, computer-vision data segment, first camera data segment, and second camera data segment. Furthermore, a second segment identifier 806, that is different from the first segment identifier 804 and the global frame identifier 802, is provided within the depth data segment.

Figure 9:
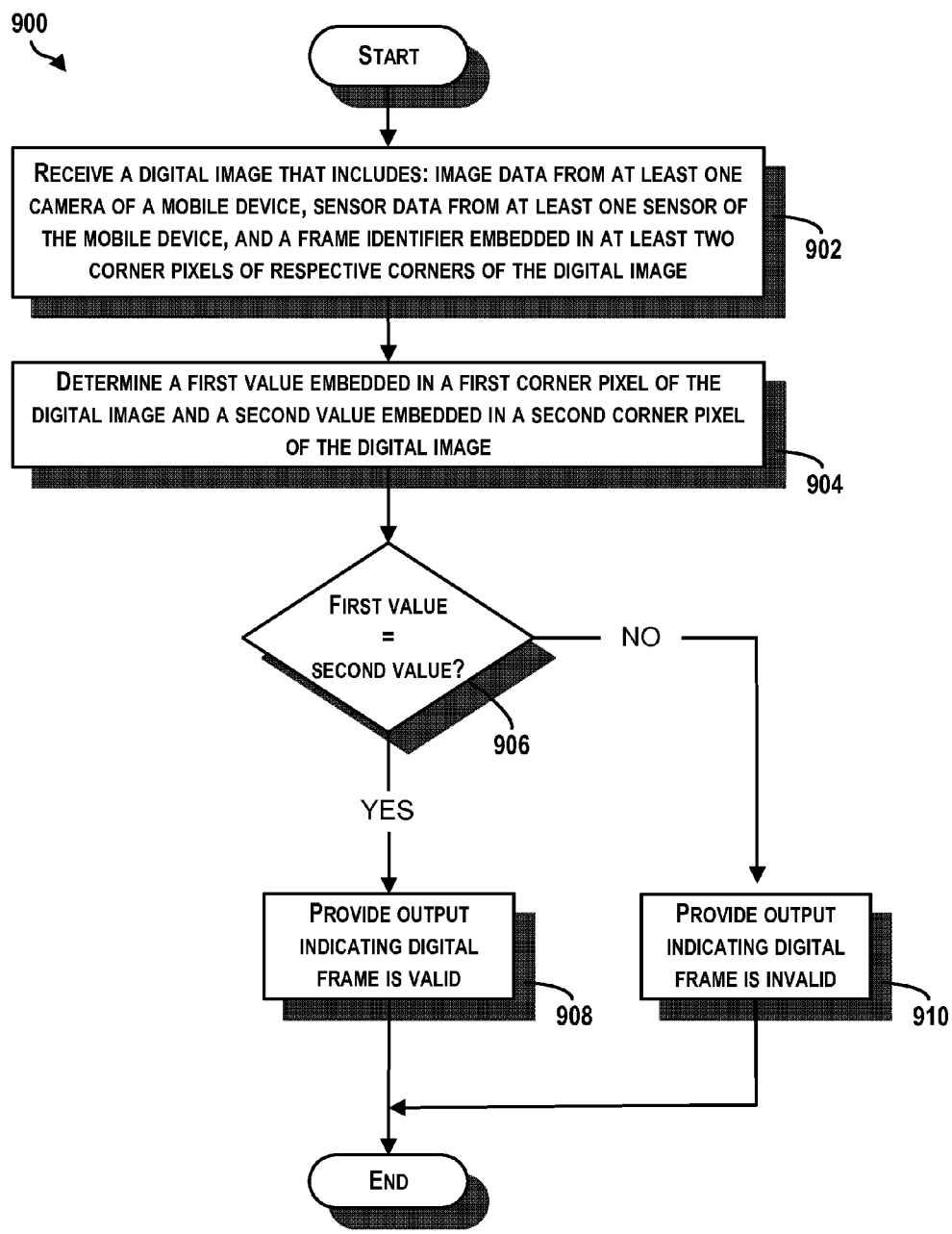
FIG. 9 is a block diagram of an example method for testing a digital image.

As discussed above, an application processor (or other entity) that receives a digital frame from the co-processor may be configured to test the received digital image for errors using the embedded global frame identifiers and/or segment frame identifiers. FIG. 9 is a block diagram of an example method 900 for testing a digital image. Method 900 shown in FIG. 9 presents an embodiment of a method that could be used or implemented by the computing device 100 of FIG. 1 or the computing device 200 of FIG. 2, for example, or more generally by one or more components of any computing device. Method 900 may include one or more operations, functions, or actions as illustrated by one or more of blocks 902-910. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 900, each block may represent a module, a segment, or a portion of program code, which includes one or more instructions executable by a processor or computing device for implementing specific logical functions or steps in the process. In addition, each block in FIG. 9 may represent circuitry that is wired to perform the specific logical functions in the process.

In one embodiment, functions of the method 900 may performed by an application processor of a mobile device, such as the application processor 232 of FIG. 2. In other embodiments, the functions of the method 900 may be distributed across multiple processors of a mobile device, or performed by one or more processors of a server that is remote from the mobile device.

Initially, at block 902, the method 900 includes receiving a digital image that includes: image data from at least one camera of the a mobile device, sensor data from at least one sensor of the mobile device, and a frame identifier embedded in at least two corner pixels of respective corners of the digital image. The digital image may be received from a co-processor of the mobile device that is configured to generate the digital image, as described above with respect to the example method 400 of FIG. 4, for example. Thus, the sensor data and the frame identifier may be embedded within pixels of the digital image.

At block 904, the method 900 includes determining a first value embedded in a first corner pixel of the digital image and a second value embedded in a second corner pixel of the digital image. In one example, the application processor may be configured to determine values within predetermined pixels of the digital image. For instance, the application processor may be configured to determine the first value embedded in the "Y" space of a pixel in row 1, column 1 of the digital image and a second value embedded in the "Y" space of a pixel in the last row and last column of the digital image. Thus, the first value and the second value may be determined by identifying a numerical value embedded in the "Y" space of two or more predetermined pixels of the digital image.

At block 906, the method 900 includes comparing the first value and the second value. If the first value is equal to the second value, at block 908, the method includes providing an output indicating that the digital frame is valid. For instance, if the first value and the second value agree, this may be indicative that a frame tear did not occur.

On the other hand, if the first value is not equal to the second value, at block 910, the method includes providing an output indicating that the digital frame is invalid. If the first value and the second value do not agree, the digital frame may have errors, due to a frame tear or other reason. Therefore, the output provided at block 910 may indicate that the data of the digital frame may have been corrupted during the generation or transmission of the digital image. In some examples, in response to detecting that the frame identifiers embedded within the digital image do not agree, the application processor may request that the co-processor regenerate and/or resend the digital image.

In one embodiment, a frame identifier may have been embedded in four corner pixels of four respective corners of the digital image. Testing the digital image may then involve determining a first value, second value, third value, and fourth value embedded in a first corner pixel, second corner pixel, third corner pixel, and fourth corner pixel respectively of the four corner pixels of the digital image. The application processor may then compare the four determined values. Based on the comparison, the application processor may provide an output indicative of a validity of the digital image. For instance, in response to determining that the four values are equal, the application processor may provide an output indicating that the digital image is valid. As another example, in response to determining that the four values are not all the same, the application processor may provide an output indicating that the digital image is invalid.

Figure 10:
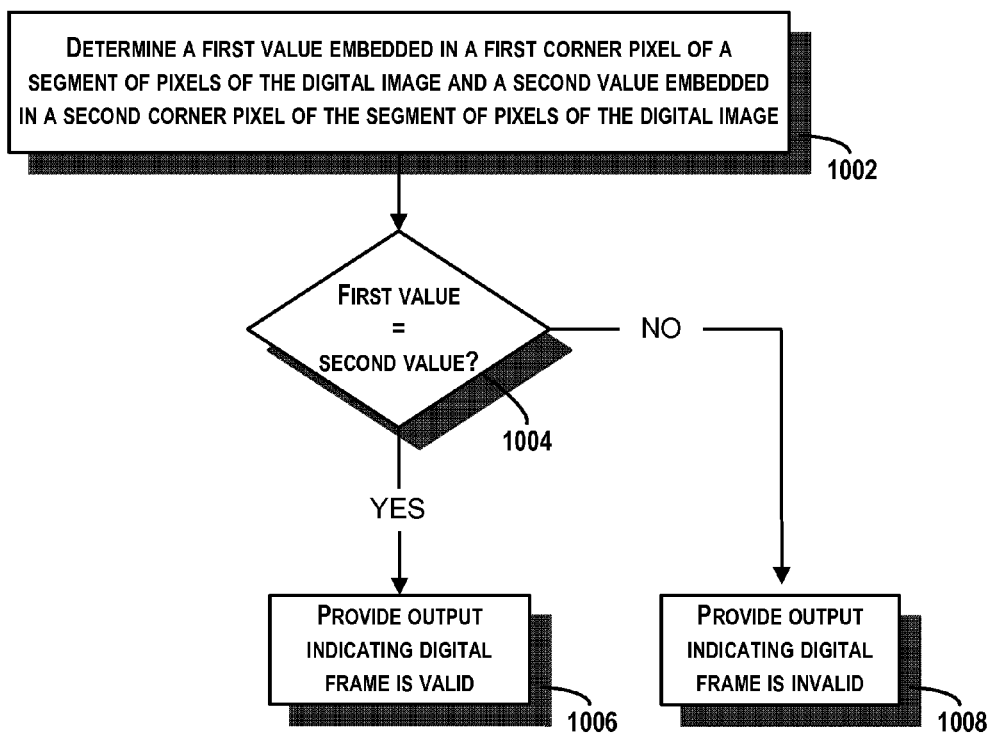
FIG. 10 is a block diagram of additional or optional functions that may be performed in conjunction with the example method of FIG. 9.

In another embodiment, a segment frame identifier may have been embedded within at least two corners of a segment of pixels of the digital image. The application processor may then be configured to test the validity of the digital image using the segment frame identifier. FIG. 10 is a block diagram of additional or optional functions that may be performed in conjunction with the example method of FIG. 9.

The function at block 1002 involves determining a first value embedded in a first corner pixel of a segment of pixels of the digital image, and determining a second value embedded in a second corner pixel of the segment of pixels of the digital image. For instance, the application processor may be configured to determine a first value embedded in the "Y" space of a first predetermined pixel of the segment of pixels and a second value embedded in the "Y" space of a second predetermined pixel of the segment of pixels.

The function at block 1004 involves comparing the first value and the second value. If the first value is equal to the second value, at block 1006, an output may be provided indicating that the digital frame is valid. For example, if the application processor has already determined that the embedded global frame identifiers are equal (at block 906), the result of the comparison at block 1004 may be used to further validate the data of the digital image.

In another instance, the output provided at block 1006 may further or instead indicate that the segment of pixels is valid. For example, the output provided at block 1006 may indicate that the segment of pixels is valid, without providing any indication of whether the entire digital image is valid or invalid.

On the other hand, if the first value is not equal to the second value, at block 1008, an output may be provided indicating that the digital frame is invalid. In some instances, the output provided at block 1008 may further or instead indicate that the segment of pixels is invalid. In response to determining that a particular segment of pixels is invalid, the application processor may request that the co-processor regenerate and/or resend the particular segment of pixels.

In other embodiments, a segment frame identifier(s) embedded within multiple segments of pixels of the digital image may be tested using the functions described with respect to blocks 1002-1008. Testing segment frame identifier(s) embedded within particular segments of the digital image may enable the application processor to identify particular segments of pixels within the digital image as valid or invalid by providing multiple outputs.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a processor of a mobile device, image data from at least one camera of the mobile device and sensor data from at least one sensor of a plurality of sensors of the mobile device;

generating, by the processor, a digital image that includes at least the image data and the sensor data, wherein the sensor data is embedded in pixels of the digital image;

embedding, by the processor, a frame identifier corresponding to the digital image in at least two corner pixels of respective corners of the digital image, wherein the digital image comprises a first segment of pixels corresponding to the image data and a second segment of pixels corresponding to the sensor data and wherein embedding the frame identifier comprises embedding the frame identifier in pixels located in at least two corner pixels of respective corners of the first segment of pixels and at least two corner pixels of respective corners of the second segment of pixels; and providing, by the processor, the digital image to an application processor of the mobile device.

2. The method of claim 1, wherein the frame identifier comprises a frame number.

3. The method of claim 1, wherein the at least two corner pixels of the respective corners of the digital image comprise pixels of the digital image that are located within a threshold number of columns and a threshold number of rows from the respective corners of the digital image.

4. The method of claim 1, further comprising embedding the frame identifier corresponding to the digital image in four corner pixels of four respective corners of the digital image.

5. The method of claim 1, further comprising embedding the frame identifier in pixels located in four corners pixels of four respective corners of the first segment of pixels and four corner pixels of four respective corners of the second segment of pixels.

6. The method of claim 5, further comprising:

receiving depth data from a depth processor of the mobile device, wherein the digital image further comprises a third segment of pixels corresponding to the depth data; and embedding the frame identifier in pixels located in four corner pixels of four respective corners of the third segment of pixels.

7. The method of claim 1, wherein the sensor data comprises data from an inertial measurement unit of the mobile device.

8. A method comprising:

receiving, by a processor of a mobile device, image data from at least one camera of the mobile device and sensor data from at least one sensor of a plurality of sensors of the mobile device, the image data comprising first image data from a first camera and second image data from a second camera;

generating, by the processor, a digital image that includes at least the image data and the sensor data, wherein the sensor data is embedded in pixels of the digital image;

embedding, by the processor, a frame identifier corresponding to the digital image in at least tow corner pixels of respective corners of the digital image; and providing, by the processor, the digital image to an application processor of the mobile device;

wherein the digital image comprises a first segment of pixels corresponding to the first image data, a second segment of pixels corresponding to the second image data, and a third segment of pixels corresponding to the sensor data; and wherein embedding the frame identifier comprises embedding the frame identifier in pixels located in at least two corner pixels of respective corners of the first segment of pixels and at least two corner pixels of respective corners of the second segment of pixels.

9. The method of claim 8, wherein the sensor data comprises data from an inertial measurement unit of the mobile device.

10. The method of claim 8, wherein:

the at least two corner pixels of the respective corners of the first segment of pixels comprise pixels that are located within a threshold number of columns and a threshold number of rows from the respective corners of the first segment; and the at least two corner pixels of the respective corners of the second segment of pixels comprise pixels that are located within a threshold number of columns and a threshold number of rows from the respective corners of the second segment.

11. A mobile device comprising:

at least one camera;

a sensor; and a co-processor, the co-processor configured to:

generate a digital image that includes image data from the at least one camera and sensor data from the sensor, wherein the sensor data is embedded in pixels of the digital image, and embed a frame identifier corresponding to the digital image in at least two corner pixels of respective corners of the digital image; and an application processor, the application processor configured to:

receive the digital image from the co-processor, determine a first value embedded in a first corner pixel of the at least two corner pixels and a second value embedded in a second corner pixel of the at least two corner pixels, and based on a comparison between the first value and the second value, provide an output indicative of a validity of the digital image.

12. The mobile device of claim 11, further comprising a camera bus interface, wherein the application processor is configured to receive the digital image from the co-processor using the camera bus interface.

13. The mobile device of claim 11, wherein providing the output indicative of the validity of the digital image based on the comparison between the first value and the second value comprises providing an output indicating that the digital image is valid when the first value and the second value are the same value.

14. The mobile device of claim 11, wherein providing the output indicative of the validity of the digital image based on the comparison between the first value and the second value comprises providing an output indicating that the digital image is invalid when the first value and the second value are not the same value.

15. The mobile device of claim 11:

wherein the co-processor is configured to embed the frame identifier corresponding to the digital image in four corner pixels of four respective corners of the digital image, and wherein the application processor is configured to:

determine a first value, second value, third value, and fourth value embedded in a first corner pixel, second corner pixel, third corner pixel, and fourth corner pixel respectively of the four corner pixels of the digital image, and based on a comparison between the first value, second value, third value, and fourth value, provide an output indicative of a validity of the digital image.

16. The mobile device of claim 11:
wherein the image data from the at least one camera comprises first image data from a first camera and second image data from a second camera, and
wherein the sensor data comprises sensor data from an inertial measurement unit (IMU).

17. A method comprising:
receiving, by an application processor of a mobile device and from a co-processor of the mobile device, a digital image that includes image data from at least one camera of the mobile device and sensor data from at least one sensor of the mobile device, wherein the sensor data is embedded in pixels of the digital image, and wherein the digital image further comprises a frame identifier embedded in at least two corner pixels of respective corners of the digital image;
determining, by the application processor, a first value embedded in a first corner pixel of the at least two corner pixels and a second value embedded in a second corner pixel of the at least two corner pixels of the respective corners of the digital image; and
based on a comparison between the first value and the second value, providing an output indicative of a validity of the digital image.

18. The method of claim 17:
wherein the digital image comprises a first segment of pixels corresponding to the image data and a second segment of pixels corresponding to the sensor data, wherein the digital image comprises a frame identifier embedded in at least two corner pixels of respective corners of the first segment of pixels, and wherein the method further comprises:
determining a third value embedded in a first corner pixel of the at least two corner pixels of the first segment of pixels and a fourth value embedded in a second corner pixel of the at least two corner pixels of the first segment of pixels; and
based on a comparison between the third value and the fourth value, providing another output indicative of a validity of the image data.

19. The method of claim 18:
wherein the digital image comprises a frame identifier embedded in at least two corner pixels of respective corners of the second segment of pixels, and wherein the method further comprises:
determining a fifth value embedded in a first corner pixel of the at least two corner pixels of the second segment of pixels and a sixth value embedded in a second corner pixel of the at least two corner pixels of the second segment of pixels; and
based on a comparison between the fifth value and the sixth value, providing another output indicative of a validity of the sensor data.

20. The method of claim 17, wherein the at least two corner pixels of the respective corners of the digital image comprise pixels of the digital image that are located within a threshold number of columns and a threshold number of rows from the respective corners of the digital image.

* * * * *